United States Patent

Olsen et al.

[11] Patent Number: 5,569,560
[45] Date of Patent: Oct. 29, 1996

[54] COMPLEXING AGENT FOR IMPROVED PERFORMANCE IN A LITHIUM BASED HYBRID ELECTROLYTE

[76] Inventors: Ib I. Olsen, 1800 Green Valley Park Way, Apt. 223; Jerry L. Morris, 1882 Fairfield Ter., both of Henderson, Nev. 89014

[21] Appl. No.: 422,183

[22] Filed: Apr. 12, 1995

[51] Int. Cl.$^6$ ................................................. H01M 6/18
[52] U.S. Cl. .......................... 429/192; 429/191; 429/198
[58] Field of Search ................................. 429/192, 191, 429/198; 252/62.2

[56] References Cited

U.S. PATENT DOCUMENTS

| | | | |
|---|---|---|---|
| 5,272,021 | 12/1993 | Asai et al. | 429/192 |
| 5,294,501 | 3/1994 | Chaloner-Gill | 429/192 |
| 5,294,502 | 3/1994 | Shackle et al. | 429/192 |
| 5,350,646 | 9/1994 | Armand et al. | 429/192 |

OTHER PUBLICATIONS

H. S. Lee, X. Q. Yang, and J. McBreen, "A New Family of Anion Receptors and Their Effect on Ion Pair Dissociation and Conductivity of Lithium Salts in Non–aqueous Solutions." Extended Abstracts—Fall Meeting 1994. The Electrochem. Soc. vol. 94–2 (1994) pp. 196–197. (month N/A).

*Primary Examiner*—M. Nuzzolillo
*Attorney, Agent, or Firm*—Robert Krebs

[57] ABSTRACT

A solid electrolyte that includes a complexing agent that is incorporated into the solid matrix provides for more effective transfer of current in an electrochemical cell or battery. The complexing agent immobilizes anions in the solid electrolyte so that at least a substantial majority of the charge transport is due to the cations, e.g., lithium ions. Preferred complexing agents are derived from aza-ethers. With the inventive solid electrolyte, it is expected that the lithium transference number should approach unity.

16 Claims, No Drawings

COMPLEXING AGENT FOR IMPROVED PERFORMANCE IN A LITHIUM BASED HYBRID ELECTROLYTE

FIELD OF THE INVENTION

The present invention relates to solid electrochemical devices and, more particularly, to solid solvent-containing electrolytes which are capable of providing more effective current transfer.

BACKGROUND OF THE INVENTION

Electrochemical cells containing an anode, a cathode and a solid, solvent-containing electrolyte are known in the art and are usually referred to as "solid batteries." These cells offer a number of advantages over electrochemical cells containing a liquid electrolyte (i.e., "liquid batteries") including improved safety features.

In solid batteries the solid electrolyte is interposed between the cathode and anode. The solid electrolyte contains either an inorganic or an organic matrix as well as a suitable salt. The inorganic matrix may be non-polymeric, (e.g, β-alumina, silicon dioxide, and lithium iodide), or polymeric, (e.g., inorganic (polyphosphazene) polymers), whereas the organic matrix is typically polymeric. Suitable organic polymeric matrices are well known in the art and are typically organic polymers obtained by polymerization of a suitable organic monomer as described, for example:, in U.S. Pat. No. 4,908,283. Suitable organic constituents include, by way of example, polyethylene oxide, polypropylene oxide, polyethyleneimine, polyepichlorohydrin, polyethylene succinate, and an acryloyl-derivatized polyalkylene oxide containing an acryloyl group of the formula $CH_2=CR'C(())O-$ where R' is hydrogen or lower alkyl of from 1–6 carbon atoms. Because of the expense and difficulty in shaping inorganic non-polymeric matrices into the desired configurations, solid electrolytes containing polymeric matrices are preferred.

The solid electrolytes may also contain a solvent (plasticizer) which is typically added to the matrix in order to enhance the solubility of the inorganic salt in the solid electrolyte and thereby increase the conductivity of the electrolytic cell. Suitable solvents well known in the an for use in such solid electrolytes include, by way of example, propylene carbonate, ethylene carbonate, γ-butyrolactone, tetrahydrofuran, glyme (1,2-dimethoxyethane), diglyme, triglyme, tetraglyme, dimethylsulfoxide, dioxolane, sulfolane and the like.

Solid hybrid electrolytes are heterogeneous multi-phase electrolytes containing at least one ion conducting phase. A hybrid electrolyte, suitable for electrochemical cells, comprises a liquid phase and a solid polymeric phase. In most electrolyte systems that employ organic solvents, the salt is usually not completely dissociated. This is due to a combination of low permitivity of the solvent and the relatively high salt concentration, which is required in many applications such as batteries and super capacitors. When the salt is not fully dissociated, a series of equilibria will exist in which associated species are formed. Those species can be ion-pairs, triplets, and even larger clusters of ions. They may all be mobile in the electrolyte and contribute to the charge transport. In batteries, for example, the electrodes are active only towards one of the ion constituents and blocking towards the other. Specifically, in alkali, secondary batteries the cation is the electrode active species.

The transport number of an ion in a given electrolyte solution is the fraction of the total electrical current carried in the solution by that ion. Every species in the electrolyte has a transport number $t_i$, which must always be positive and between zero and one as:

$$\sum_i t_i = \sum_i \frac{i_i}{i} = 1$$

Where ion association occurs, it is impossible to distinguish between simple ions and other charged species. Instead the total material transfer or total current is determined. Therefore, an observable quantity relies on the transfer of an ion constituent and not a free ion. This quantity is called the transference number. Because the transference number is based on the transport of the gram-equivalent of one faraday, it follows that:

$$\sum_R T_R = 1$$

In a conventional solid electrochemical cell, the cations and anions in the electrolyte are evenly distributed throughout the electrolyte when the cell is not generating any current. When a current is being generated and both the anions and cations are mobile (each, for instance, with a transference number of 0.5), then half of the current through the electrolyte is transported by the cation and the other half by the anion. In most systems, only the cation react/intercalate with the electrodes, so eventually there is an accumulation of anions at the electrode, which is discharged. (The rate of accumulation depends on the electrolyte composition, the current density, and the electrolyte thickness.) Since the amount of negative and positive charges in a given volume in the discharged is equal the electrolyte is polarized. This will lead to a number of phenomena. In the steady state situation all the current will have to be carried by the cation, so the conductivity of the electrolyte drops to half of its original value. Furthermore, a salt concentration gradient will develop in the electrolyte. This will further increase the resistance of the electrolyte, which leads to both a reduction in power capability and effectiveness of the battery. In the case of recharging a lithium metal anode battery, uneven plating will occur, which leads to a shorter cycle life. For a discussion of transference number, see F. M. Gray, "Solid Polymer Electrolytes" (1991), pp. 193–94, VCH Publishers, Inc.

In view of the above shortcomings associated with prior art solid state electrochemical devices, there is a need for solid electrolytes that exhibit reduced polarization and electrochemical cells that have improved cycle life, capacity.

SUMMARY OF THE INVENTION

The present invention is based in part on the discovery that by employing a complexing agent to immobilize the anions, lithium cations will effectively carry the current in the solid electrolyte of an electrochemical cell. Indeed, the lithium cation transference number is expected to be greater than about 0.6, preferably about 0.7 to about 0.9.

In one compositional aspect, the invention is directed to a solid electrolyte comprising:

a solid polymeric matrix having complexing agents incorporated therein;

an inorganic salt; and a solvent.

In a further compositional aspect, the invention is directed to an electrochemical cell comprising:

an anode;

a cathode; and interposed between said anode and cathode, a polymeric electrolyte comprising:

(i) a solid polymeric matrix incorporating complexing agents;

(ii) an inorganic salt; and (iii) a solvent.

The invention is also directed to batteries comprising the electrochemical cells.

The invention is further directed to a method for fabricating an electrochemical cell which comprises an anode, a cathode, which comprises the steps of:

preparing a solid solvent-containing electrolyte which comprises:

(i) a solid polymeric matrix having complexing agents incorporated therein;

(ii) an inorganic salt; and (iii) a solvent; and interposing said solid solvent-containing electrolyte between said anode and said cathode.

In a preferred embodiment, the complexing agents comprise aza-ether moieties.

DETAILED DESCRIPTION OF THE PREFERRED EMBODIMENTS OF THE INVENTION

The present invention relates to a solid electrolyte, which, by virtue of the presence complexing agents employed therein, is capable of providing for a more effective transfer of current in an electrochemical cell or battery. The complexing agent effectively immobilizes the anions in the solid electrolyte so that at least a substantial majority of the charge transport is due to the cations, e.g., lithium ions. With the inventive solid electrolyte, it is expected that the lithium transference numbers should approach unity.

However, prior to describing this invention in further detail, the following terms will be defined.

The term "solid polymeric matrix" or "solid matrix" refers to an electrolyte and/or composite electrode compatible material formed by polymerizing an inorganic or organic monomer (or partial polymers thereof) and which, when used in combination with the other components of the electrolyte or the composite electrode, renders the electrolyte or composite electrode solid. The solid matrix may or may not be ion-conducting. Preferably, however, the solid matrix is capable of ionically conducting inorganic cations (e.g., alkali ions). When employed to form the electrolyte or the composite electrode, the solid matrix forming monomer is preferably polymerized in the presence of the alkali salt and the electrolytic solvent to form solid matrices which are suitable for use as solid electrolytes or composite electrodes in electrolytic cells.

Suitable solid polymeric matrices are well known in the art and include solid matrices formed from inorganic polymers, organic polymers or a mixture of polymers with inorganic non-polymeric materials. Preferably, the solid polymeric matrix is an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a non-polymeric inorganic matrix. See, for example, U.S. Pat. No. 4,990,413 which is incorporated herein by reference in its entirety. Suitable non-polymeric inorganic materials for use in conjunction with the solid polymeric matrix include, by way of example, $\beta$-alumina, silver oxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference.

The term "a solid matrix forming monomer" refers to inorganic or organic materials which in monomeric form can be polymerized to form solid polymeric matrices. Suitable solid matrix forming monomers are well known in the art and the particular monomer employed is not critical. Preferably, the solid matrix forming monomers contain hetero atom functionalities capable of forming donor acceptor bonds with the cations of the alkali salt so as to render the solid matrix ion-conducting (i.e., able to conduct the alkali cations). Ion-conducting hetero atom functionalities in solid polymeric matrices include, by way of example, ether groups, amine groups, and the like. On the other hand, non-conductive solid matrix forming monomers can also be used herein including, by way of example, monomers not containing hetero atoms and monomers containing non-conductive hetero atom functionalities such as carboxylic acid groups, sulfonic acid groups, and the like. The latter are nonconductive because they strongly bind the alkali cation.

Examples of suitable solid matrix forming monomers include, by way of example, ethyleneimine, ethylene oxide, epichlorohydrine, acryloyl-derivatized polyalkylene oxides (disclosed in U.S. Pat. No. 4,908,283, which is incorporated herein) urethane acrylate, vinyl sulfonate polyalkylene oxides (as disclosed in U.S. Pat. No. 5,262,253 and incorporated herein), acrylic acid, chloroacrylic acid, bromoacrylic acid, crotonic acid, propylene, ethylene and the like as well as mixtures thereof.

Examples of suitable inorganic solid matrix forming monomers include, by way of example, phosphazines and siloxanes. Phosphazine monomers and the resulting polyphosphazine solid matrix are disclosed by Abraham et at., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized to form solid polymeric matrices.

The term "prepolymer" refers to solid matrix forming monomers and/or partial polymers thereof.

The term "cured" or "cured product" refers to the treatment of prepolymers under polymerization conditions so as to form a solid polymeric matrix. The resulting cured product can include cross-linking between polymer backbones. Suitable polymerization conditions are well known in the art and include by way of example, heating the monomer, irradiating the monomer with UV light, electron beams, etc. Examples of cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the alkali salt and the electrolytic solvent. For example, a composition comprising requisite amounts of the solid matrix forming monomer, alkali salt and electrolytic solvent can be applied to a substrate and then cured. Alternatively, the solid matrix forming monomer can be first cured and then dissolved into a suitable volatile solvent. Requisite amounts of the alkali salt and electrolytic solvent can then be added. The mixture is then placed on a substrate and removal of the volatile solvent results in formation of a solid electrolyte. In either case, the resulting solid electrolyte is a homogeneous, single phase product which is maintained upon curing or evaporation, and does not readily separate upon cooling to temperatures below room temperature. Accordingly, the solid electrolyte of this invention does not include a separator as is typical of liquid electrolytes.

The term "compatible electrolyte solvent" or "electrolytic solvent," or in the context of components of the solid electrolyte, just "solvent," is a low molecular weight organic plasticizer added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as propylene carbonate, ethylene carbonate, gamma-butyrolactone, glyme, diglyme, triglyme, tetraglyme, dimethylsulfoxide, dioxolane, sulfolane, and the like. A particularly preferred solvent is disclosed in U.S. Pat. No. 5,262,253, which is incorporated herein.

The term "salt" refers to any salt, for example, an inorganic salt, which is suitable for use in a solid electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2C_3)_2^-$, and the like. Specific examples of suitable inorganic ion salts include $LiClO_4$, $LiSCN$, $LiBF_4$, $LiAsF_6$, $Li[N(SO_2CF_3)_2]$, $LiCF_3SO_3$, $LiPF_6$, $NaSCN$, and the like. The inorganic ion salt preferably contains at least one atom selected from the group consisting of Li, Na and K.

The term "hydrocarbyl" and "hydrocarbylene" generally refer to monovalent organic radicals composed of carbon and hydrogen which may be aliphatic, alicyclic, aromatic, or combinations thereof, e.g., aralkyl. Examples of hydrocarbylene groups include alkylene, such as ethylene, propylene, hexamethylene and the like, arylene, such as phenylene, naphthalene, and the like, hydrocarbyl groups include alkyl, such as methyl, ethyl, propyl, butyl, isobutyl, pentyl, hexyl, heptyl octyl, and the like, alkenyls, such as propenyl, isobutenyl, hexenyl, octenyl, and the like, aryl, such as phenyl, alkylphenyl, including 4-methylphenyl, 4-ethylphenyl, and the like. Likewise, oxyhydrocarbyl refers to hydrocarbyl radicals containing minor amounts of oxygen, such as alkoxy, e.g., ethoxyethyl, propoxyethyl, and the like. And likewise, oxyhydrocarbylene refers to hydrocarbylene groups containing minor amounts of oxygen, such as oxyalkylene, e.g., oxyethylene, oxypropylene, poly(oxyalkylene), poly(oxyethylene) and the like.

The term "complexing agent" refers to a moiety having one or more receptor sites that are capable of binding (or complexing) with anions in a solid electrolyte of an electrolytic cell with sufficient affinity to effectively immobilize the anions thereby substantially reducing the anionic transference number. Preferably, the complexing agent is bonded to a host molecule such as a solid matrix forming monomer or prepolymer so that upon curing the complexing agent is incorporated as part of the polymeric network. For lithium batteries, preferred complexing agents can be derived from aza-ethers, including linear, multi-branched, and cyclic aza-ethers, illustrated by Formulas: I, II, and III, respectively.

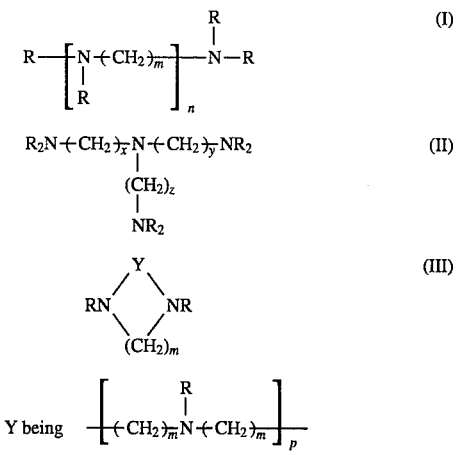

For the above formulas, n is an integer from 1 to about 5, preferably from 1 to 3, m, x, y, and z are each an integer from 1 to about 4, preferably from 2 to 3, and p is an integer from 1 to about 4, preferably 2; R is any suitable electron-withdrawing group such as $CF_3SO_2$, electron-withdrawing hydrocarbyl groups including alkyls, such as methyl, ethyl, propyl, butyl, isobutyl, pentyl, hexyl, heptyl, octyl, and the like, and oxyhydrocarbyls such as alkoxy, e.g., ethoxyethyl, propoxyethyl, and the like, and, oxyhydrocarbylenes such as oxyalkylene, e.g., oxyethylene, oxypropylene, poly(oxyalkylene), poly(oxyethylene) and the like.

For a discussion of aza-ethers see, for example, Lee et al. "A New Family of Anion Receptors and their Effect on Ion Pair Dissociation and Conductivity of Lithium Salts in Non-Aqueous Solutions", Extended Abstracts—Fall Meeting 1994. The Electrochem Soc. Vol. 94-2 (1994) pages 196–197.

As an illustration of incorporating a complexing agent into a polymeric matrix that is derived from acrylates, an acrylated halogen derivative (IV) is first synthesized by the following scheme:

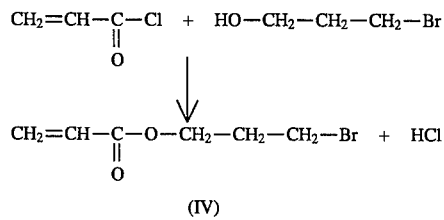

Thereafter, as shown in the following scheme, reacting the acrylated halogen derivative with aza-ether (V), for example, would yield aza-acrylate (VI) which can be used as a solid matrix forming monomer:

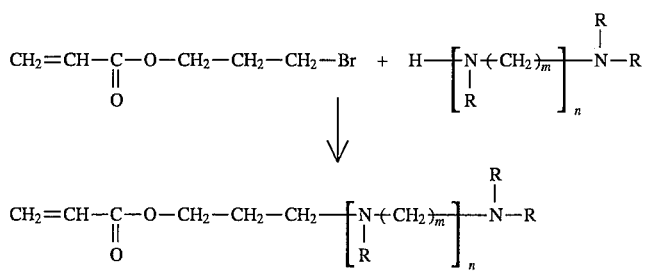

As is apparent, aza-ether (I) was modified by substituting a hydrogen for one R group to produce aza-ether (V). As is apparent, once the choice of host molecule (i.e., solid polymeric matrix forming monomers or prepolymers) and complexing agent is made, the appropriate synthetic process to incorporate the complexing agent into the solid polymeric matrix can be readily designed by a person skilled in the art.

As is apparent, the mount of complexing agent incorporated into a solid matrix can vary and will depend on the inorganic salt concentration in the electrolyte. The solid matrix should have enough complexing agents incorporated therein to effectively immobilize the anions so that the cation (e.g., lithium ion) transference number is greater than about 0.6, preferably about 0.7 to about 0.9. The complexing agent concentration will also depend on the particular complexing agent (or combination of agents) employed since the number of receptor sites may vary as well. It is expected that a single receptor site will not provide a sufficient bond with an anion to fully immobilize the anion. However, it is believed that the receptor sites of the aza-ethers align in a three dimensional cage wherein the anion can be immobilized. It is expected that at least four receptor sites is necessary to fully immobilize an anion. The sites can come from multiple molecules in the case of linear and branched aza-ether, or from a single cyclic aza-ether. Preferably, the ratio of the receptor site concentration to the anion concentration in the solid electrolyte should be from about 4:1 to 16:1.

The term "electrochemical cell" or "electrolytic cell" refers to a composite structure containing an anode, a cathode, and an ion-conducting electrolyte interposed therebetween.

The term "battery" refers to two or more electrochemical cells electrically interconnected in an appropriate series/parallel arrangement to provide the required operating voltage and current levels.

The anode is typically comprised of a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Particularly preferred anodes include lithium intercalation anodes employing carbon materials such as graphite, cokes, mesocarbons, and the like. Such carbon intercalation based anodes typically include a polymeric binder suitable for forming a bound porous composite having a molecular weight of from about 1,000 to 5,000,000. Examples of suitable polymeric binders include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like. The anode also may include an electron conducting material such as carbon black.

The cathode is typically comprised of a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$, lithiated manganese oxides, e.g., $LiMn_2O_4$, lithiated nickel oxides, e.g., $LiNiO_2$, and the like.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000. Examples of suitable polymeric binders include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like.

Methodology

A preferred method of fabricating an electrochemical cell is described herein. In addition, methods for preparing solid electrochemical cells and batteries are described in the art, for example, in U.S. Pat. No. 5,300,373, 5,316,556, 5,346, 385, 5,262,253 and U.S. patent application Ser. Nos. 07/918, 509 filed Jul. 22, 1992; 08/049,212, filed Apr. 19, 1993, which are all incorporated herein in their entirety. The complexing agent can be incorporated into the solid solvent-containing electrolyte at any convenient step in the fabrication of the cell or battery. Preferably, the complexing agent is first bonded to a host molecule. For the following example, the solid polymeric matrix, is formed from a mixture of solid matrix forming monomers comprising urethane acrylate and the aza-acrylate of Formula VI described above.

In one preferred embodiment, the cathode is prepared from a cathode paste which comprises frown about 35 to 65 weight percent of a compatible cathodic material; from about 1 to 20 weight percent of an electroconductive agent; from about 0 to 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 25 weight percent of a sold matrix forming monomer or partial polymer thereof. Also included is an ion conducting amount of an inorganic ion salt. Generally, the amount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, frown about 10 to 20 weight percent; and even more preferably from about 10 to about 15 weight percent. The percentage of salt present depends on the type of salt and electrolytic solvent employed.

The electrolyte composition typically comprises from 0 to about 80 weight percent electrolyte solvent (e.g., organic carbonate/glyme mixture) based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the an and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

EXAMPLES

The following Example 1 illustrates a method of how an electrolytic cell could be fabricated.

Example 1

A solid electrolytic cell is prepared by first preparing a cathodic slurry which is spread onto a current collector. An electrolyte solution is then placed onto the cathode surface and the cathode slurry and electrolyte solution are simultaneously cured to provide for a solid electrolyte composition. Similarly, an anode composition is placed on a current collector and then an electrolytic solution is placed onto the anode composition and both are cured to form a solid electrolytic composition. Thereafter, the anode and cathode are laminated so that the solid electrolyte composition (containing the complexing agent) is situated therebetween to provide for a solid electrolytic cell. The specifics of this construction are as follows:

A. The Cathode Current Collector

The cathode current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween. The aluminum foil is preferably an alloy that is identified by either the industry specifications 1235-H19 (99.35% min. Al), or 1145-H19 (99.45 % min. Al), and which is available from All Foils, Inc., Brooklyn Heights, Ohio. (Alternatively, aluminum mesh can be used as the current collector.)

The adhesion promoter layer is prepared as a dispersed colloidal solution in one of two methods. The first preparation of this colloidal solution for this example is as follows:

8.44 pans by weight of carbon powder (Shawinigan Black™—available from Chevron Chemical Company, San Ramon, Calif.)

33.76 parts by weight of a 25 weight percent solution of polyacrylic acid (a reported average molecular weight of about 90,000, commercially available from Aldrich Chemical Company—contains about 84.4 grams polyacrylic acid and 253.2 grams water)

57.80 parts by weight of isopropanol

In a preferred embodiment of the first method, an additional amount of water, e.g., 2–3 weight percent water based on the total weight of the colloidal solution, is incorporated to enhance coatability. Also, about 1 weight percent methyl ethyl ketone is added to the composition to enhance weltability of the aluminum.

The carbon powder and isopropanol are combined with mixing in a conventional high shear colloid mill mixer (Ebenbach-type colloid mill) until the carbon is uniformly dispersed and the carbon particle size is smaller than 10 µm. At this point, the 25 weight percent solution of polyacrylic acid is added to the mixer and further mixed for approximately 15 minutes. The resulting mixture is pumped to the coating head and applied by a reverse Gravure roller onto a sheet of aluminum foil about 9 in. (22.86 cm) wide and about 0.0005 in. (0.00127 cm) to about 0.001 in. (0.00254 cm) thick. After application, the solvent is evaporated by placing the mixture/foil into a conventional oven. After evaporation, an electrically-conducting adhesion-promoter layer of about 4–6 µm in thickness is formed. The aluminum foil is then cut to about 8 in. (20.32 cm) wide by removing approximately ½ in. (1.27 cm) from the sides with a conventional slitter so as to remove any uneven edges; the foil can then be further cut to the desired size.

The second preparation of this colloidal solution comprises mixing 25 lbs (11.35 kg) of carbon powder (Shawinigan Black™) with 100 lbs (45.4 kg) of a 25 weight percent solution of polyacrylic acid (average molecular weight of about 240,000, commercially available from BF Goodrich, Cleveland, Ohio, as Good-Rite K702—contains about 25 lbs (11.35 kg) polyacrylic acid and 75 lbs (34.05 kg) water) and with 18.5 lbs (8.399 kg) of isopropanol. Stirring is done in a 30 gallon (113.55 liters) polyethylene drum with a gearmotor mixer (e.g., Lighting Labmaster Mixer, model XJ-43, available from Cole-Parmer Instruments Co., Niles, Ill.) at 720 rpm with two 5 in. (12.7 cm) diameter A310-type propellers mounted on a single shaft. This wets down the carbon and eliminates any further dust problem. The resulting weight of the mixture is 143.5 lbs (65.149 kg) and contains some "lumps."

The mixture is then further mixed with an ink mill which consists of three steel rollers almost in contact with each other, turning at 275, 300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 µm with the occasional 12.5 µm particles. The mixture can be stored for well over 1 month without the carbon settling out or reagglomerating.

When this composition is to be used to coat the current collector, an additional 55.5 lbs (25.197 kg) of isopropanol is mixed into the composition working with 5 gallon (18.925 1) batches in a plastic pail using an air powered shaft mixer (Dayton model 42231 available from Granger Supply Co., San Jose, Calif.) with a 4 in. (10.16 cm) diameter Jiffy-Mixer brand impeller (such as an impeller available as Catalog No. G-04541-20 from Cole Parmer Instrument Co., Niles, Ill.). Then, it is gear pumped through a 25 μm cloth filter (e.g., So-Clean Filter Systems, American Felt and Filter Company, Newburgh, N.Y.) and coated as described above.

B. The Cathode

The cathode is prepared from a cathodic slurry which, in turn, is prepared from a cathode powder as follows:

i. Cathode Powder

The cathode powder is prepared by combining 94.1±1.1 weight percent $LiMn_2O_4$ and 5.9±1.1 weight percent of carbon (Shawinigan Black™). About 100 grams of the resulting mixture is placed into a grinding machine (Attritor Model S-1 available from Union Process, Akron, Ohio) and ground for 30 minutes at 150 rpm. Afterwards, the resulting mixture is passed through a 200 mesh screen and then vacuum dried at 60° C. to produce a cathode powder with a water content of less than about 1000 ppm and preferably less than about 300 ppm.

ii. Cathode Slurry

A cathode slurry is prepared by combining sufficient cathode powder to provide for a final product having about 51.7 weight percent $LiMn_2O_4$. The slurry contains the following (in approximate weight percent):

| | |
|---|---|
| $LiMn_2O_4$ | 51.744% |
| Carbon | 6.456% |
| EPDM (ethylene propylene diene monomer) | 1.8% |
| Xylene | 40.0% |
| | 100% |

The method of preparing 100 grams of the cathode slurry is as follows:

1.8 grams of EPDM (Mooney viscosity of 26±5 and available as VISTALON™ 2504 (Exxon Chemical Co., Houston, Tex.) are mixed with 16.2 grams of xylene to form a 10.0% (wt.) EPDM solution. The temperature is maintained at between 40°–45° C. as the EPDM is added to the xylene. The solution is preferably filtered through a 20 micron filter cartridge.

An amount of carbon powder sufficient to provide 51.744 grams of $LiMn_2O_4$ per 100 grams of cathode slurry and a sufficient amount of carbon (Shawinigan Black™) to provide 6.456 grams of total carbon per 100 grams of slurry are mixed in a double planetary mixer where the blend is stirred at 7.5 Hz and 25° C. The above EPDM-xylene solution is passed through 4A molecular sieves and then added to the $LiMn_2O_4$ and carbon blend under vacuum mixing over a 5 minute period during which time an additional 23.8 grams of xylene are added. Afterwards, the mixing speed is increased from 7.5 to 20 Hz and maintained for another 5 minutes. Thereafter, the temperature of the mixture is gradually raised to 85° C. over about a 45 minute period and maintained at the elevated temperature for about 30 minutes. Next, the mixing speed is decreased to about 1 Hz and subsequently the temperature of the mixture is allowed to decrease gradually to about 45° C. over about a 30 minute period. Finally, the mixture is mixed for 5 minutes at this temperature.

The cathode slurry is then coated to a substantially uniform thickness of about 25–200 μm, more preferably 50–100 μm, and most preferably about 100 μm, over the current collector by a doctor blade, Meyer-rod, or by reverse roll coating. The cathode slurry/current collector is heated to remove the xylene.

C. Electrolyte 32.16 grams of propylene carbonate, 3.06 grams of trimethyl propane triacrylate, 32.16 grams of ethylene carbonate, and 23.54 grams of the aza-ether acrylate (Formula VI) are combined at room temperature until homogeneous. The resulting solution is optionally passed through a column of 4A molecular sieves to remove water and then the recovered solution is mixed at room temperature until homogeneous. If necessary, the ethylene carbonate can first be dissolved in propylene carbonate with heat.

At this point, 1.30 grams of polyethylene oxide film forming agent having a number average molecular weight of about 600,000 (available as Polyox WSR-205 from Union Carbide Chemicals and Plastics, Danbury, Conn.) is added to the above solution and then dispersed while stirring with a magnetic stirrer over a period of about 60–120 minutes. After dispersion, the solution is heated to between 60° and 65° C. with stirring until the film forming agent is dissolved. A thermocouple is placed at the edge of the vortex created by the magnetic stirrer to monitor solution temperature. The solution is cooled to a temperature of less than 48° C. and then 7.78 grams of $LiPF_6$ are added to the solution over a 120 minute period while thoroughly mixing to ensure a substantially uniform temperature profile throughout the solution. Cooling is applied as necessary to maintain the temperature of the solution at less than 48° C.

In one optional embodiment, the polyethylene oxide film forming agent is added to the solution via a mini-sieve, such as a 25 mesh mini-sieve that is commercially available as Order No. 57333-965 from VWR Scientific, San Francisco, Calif.

The resulting solution contains the following in approximate weight percent based on the total weight of the electrolyte solution (100 g):

| | |
|---|---|
| Propylene Carbonate | 32.16% |
| Ethylene Carbonate | 32.16% |
| Trimethylol propane triacrylate (TMPTA) | 3.06% |
| Aza-acrylate complex (Formula IV) | 23.54% |
| $LiPF_6$ | 7.78% |
| PEO Film Forming Agent | 1.30% |
| Total | 100.00% |

This solution is then degassed to provide for an electrolyte solution wherein little, if any, of the $LiPF_6$ salt decomposes.

Optionally, the above solution which contains the prepolymer, the film forming agent, the electrolytic solvent and the $LiPF_6$ salt, is filtered to remove any solid particles or gels remaining in the solution. One suitable filter device is a sintered stainless steel screen having a pore size between 1 and 50 μm at 100% efficiency.

In an alternative embodiment, the electrolyte is prepared by the following steps using the same above described electrolyte components:

1. Check the moisture level of the aza-ether acrylate. If the moisture level is less than 100 ppm water, proceed to step 2. If not, then first dissolve the aza-ether acrylate at room temperature, < 30° C., in the propylene carbonate and ethylene carbonate and dry the solution over 4A molecular sieves (Grade 514, 8–12 Mesh from Schoofs Inc., Moraga, Calif.) and then proceed to step 4.

2. Dry the propylene carbonate and ethylene carbonate over 4A molecular sieves (Grade 514, 8–12 Mesh from Schoofs Inc., Moraga, Calif.).

3. At room temperature, < 30° C., add the TMPTA and aza-ether to the solvent prepared in step 2. Stir until the resin is completely dissolved. The solution should be clear and colorless.

4. Dry and optionally sift the polyethylene oxide film forming agent through a 25 mesh mini-sieve commercially available as Order No. 57333-965 from VWR Scientific, San Francisco, Calif. While stirring add the dried and pre-sifted polyethylene oxide film forming agent slowly to the solution. The polyethylene oxide film forming agent should be sifted into the center of the vortex formed by the stirring means at a controlled rate to avoid agglomerate formation. Addition of the polyethylene oxide film forming agent should be dispersive and, during addition, the temperature should be maintained at room temperature ( < 30° C.).

5. After final addition of the polyethylene oxide film forming agent, stir to ensure that the film forming agent is substantially dispersed.

6. Heat the mixture to 68° to 75° C. and stir until the film forming agent has melted and the solution has become transparent. Optionally, in this step, the mixture is heated to 65° to 68° C.

7. Cool the solution produced in step 6 and when the temperature of the solution reaches 40° C., add the $LiPF_6$ salt very slowly making sure that the maximum temperature does not exceed 55° C. and preferably does not exceed about 40° C.

8. Thereafter, the complexing agent is added and the solution is stirred and degassed. The electrolyte solution is allowed to cool before usage.

9. Optionally, filter the solution through a sintered stainless steel screen having a pore size between 1 and 50 μm at 100% efficiency.

At all times, the temperature of the solution should be monitored with a thermocouple which should be placed in the vortex formed by the mixer.

Afterwards, the electrolyte mixture is coated by a slot die coater or a reverse roll flexographic coater to a thickness of about 25–50 μm onto the surface of the dried cathode slurry described above.

D. The Anode Current Collector

The anode current collector employed is a sheet of copper foil, about 0.33 mils (8.5 μm) to 0.5 mils (12.7 μm) thick, having a layer of adhesion promoter attached to the surface of the foil which will contact the anode so as to form a composite having a sheet of copper foil, an anode and a layer of adhesion promoter interposed therebetween. (Alternatively, copper mesh can be used as the current collector.)

The same adhesion promoter composition used with the cathode is employed with the anode.

E. The Anode

The anode is prepared from an anodic slurry which, in turn, is prepared from an anode powder as follows:

i. Anode Powder

The anode powder is prepared by combining about 93.81 weight percent of Mitsubishi Gas Carbon™ (a coke-like material) (Mitsubishi Petroleum Co. Ltd, Tokyo, Japan) and about 6.19 weight percent of carbon (Shawinigan Black™). About 100 grams of the resulting mixture is placed into a grinding machine (Attritor Model S-1) and ground for 30 minutes at 150 rpm Afterwards, the resulting mixture is passed through a 200 mesh screen and then vacuum dried at 60° C. to produce an anode powder with a water content of less than about 1000 ppm and preferably less than about 300 ppm.

ii. Anode Slurry

An anode slurry is prepared by combining sufficient anode powder to provide for a final product having about 54.6 weight percent of the Mitsubishi Gas Carbon. The slurry contains the following (in approximate weight percent):

| | |
|---|---|
| Mitsubishi Gas Carbon | 54.6% |
| Carbon | 3.6% |
| EPDM (ethylene propylene diene monomer) | 1.8% |
| Xylene | 40.0% |
| | 100% |

The method of preparing 100 grams of the anode slurry is as follows:

1.8 grams of EPDM (VISTALON™ 2504) are mixed in 16.2 grams of xylene to form a 10.0% (wt.) EPDM solution. The temperature is maintained at between 40°–45° C. as the EPDM is added to the xylene. The solution is preferably filtered through a 20 micron filter cartridge.

An amount of anode powder sufficient to provide 54.6 grams of Mitsubishi Gas Carbon per 100 grams of anode slurry and a sufficient amount of carbon (Shawinigan Black™) to provide 3.6 grams of total carbon per 100 grams of slurry are mixed in a double planetary mixer where the blend is stirred at 7.5 Hz and 25° C. The above EPDM-xylene solution is passed through 4A molecular sieves and then added to the Gas Carbon and carbon blend under vacuum mixing over a 5 minute period during which time an additional 23.8 grams of xylene are added. Afterwards, the mixing speed is increased from 7.5 to 20 Hz and maintained for another 5 minutes. Thereafter, the temperature of the mixture is gradually raised to 85° C. over about a 45 minute period and maintained at the elevated temperature for about 30 minutes. Next, the mixing speed is decreased to about 1 Hz and subsequently the temperature of the mixture is allowed to decrease gradually to about 45 ° C. over about a 30 minute period. Finally, the mixture is mixed for 5 minutes at this temperature.

The so-prepared anode slurry can be placed onto the adhesion layer of the current collector by coating a layer of the slurry having a substantially uniform thickness of about 25–200 μm, more preferably 50–100 μm, and most preferably about 50 μm, over the current collector by a doctor blade, Meyer-rod, or by reverse roll coating. The anode slurry/current collector is then heated to remove the xylene.

Afterwards, an electrolyte mixture is coated by a slot die coater or a reverse roll flexographic coater to a thickness of about 25–50 μm onto the surface of the dried anode slurry described above.

F. The Solid Electrolytic Cell

A sheet comprising a solid battery is prepared by laminating the electrolyte/anode composite with the electrolyte/cathode composite so that the electrolyte is positioned between the anode and cathode. Lamination is accomplished by minimal pressure.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. A solid electrolyte comprising:

a solid polymeric matrix having complexing agents incorporated therein wherein the complexing agents comprise aza-ether moieties;

an inorganic salt; and a solvent.

2. The solid electrolyte according to claim 1 characterized in that said complexing agents are capable of immobilizing anions.

3. The solid electrolyte of claim 2 wherein the complexing agents comprise receptor sites wherein the ratio of the receptor site concentration to the anion concentration is about 4:1 to about 16:1.

4. An electrochemical cell comprising:
   an anode;
   a cathode; and
   interposed between said anode and cathode, a polymeric electrolyte comprising:
   (i) a solid polymeric matrix incorporating complexing agents wherein the complexing agents comprise aza-ether moieties;
   (ii) an inorganic salt; and
   (iii) a solvent.

5. The electrochemical cell according to claim 4 characterized in that said complexing agents are capable of immobilizing anions.

6. The electrochemical cell of claim 5 wherein the complexing agents comprise receptor sites wherein the ratio of the receptor site concentration to the anion concentration is about 4:1 to about 16:1.

7. A battery comprising two or more electrochemical cells of claim 6.

8. The battery of claim 7 characterized in that for each electrochemical cell said complexing agents are capable of immobilizing anions.

9. The battery of claim 8 wherein the complexing agents comprise receptor sites wherein the ratio of the receptor site concentration to the anion concentration is about 4:1 to about 16:1.

10. The battery of claim 7 wherein for each electrochemical cell the anode is an intercalation based anode comprising carbon.

11. The battery of claim 10 wherein for each electrochemical cell the cathode comprises material selected from the group consisting of $LiCoO_2$, $LiMn_2O_4$, and mixtures thereof.

12. A method for fabricating an electrochemical cell which comprises an anode and a cathode, which comprises the steps of:
   preparing a solid solvent-containing electrolyte which comprises:
   (i) a solid polymeric matrix having complexing agents incorporated therein
   wherein the complexing agents comprise aza-ether moieties;
   (ii) an inorganic salt; and
   (iii) a solvent; and
   interposing said solid solvent-containing electrolyte between said anode and said cathode.

13. The method according to claim 12 characterized in that said complexing agents are capable of immobilizing anions.

14. The method according to claim 13 wherein the wherein the complexing agents comprise receptor sites wherein the ratio of the receptor site concentration to the anion concentration is about 4:1 to about 16:1.

15. The method according to claim 13 wherein the anode is an intercalation based anode comprising carbon.

16. The method according to claim 15 wherein the cathode comprises material selected from the group consisting of $LiCoO_2$, $LiMn_2O_4$, and mixtures thereof.

* * * * *